(12) United States Patent
Hsu

(10) Patent No.: US 7,468,127 B2
(45) Date of Patent: Dec. 23, 2008

(54) HAND HELD SHOWER HEAD WITH FILTER REPLACING PRE-ALARM ASSEMBLY

(76) Inventor: Chao Fou Hsu, 9Fl., No. 16, Lane 417, Huangshing Rd., Sanmin Chiu, Kaohsiung (TW) 807

( * ) Notice: Subject to any disclaimer, the term of this patent is extended or adjusted under 35 U.S.C. 154(b) by 348 days.

(21) Appl. No.: 11/029,409

(22) Filed: Jan. 6, 2005

(65) Prior Publication Data
US 2005/0205475 A1   Sep. 22, 2005

(30) Foreign Application Priority Data
Mar. 16, 2004   (TW) .................. 93107331 A
Mar. 16, 2004   (TW) .................. 93107337 A

(51) Int. Cl.
*B01D 35/143* (2006.01)

(52) U.S. Cl. .................. 210/87; 210/449; 210/460

(58) Field of Classification Search .................. 210/449, 210/460, 85, 87, 89, 238; 340/610
See application file for complete search history.

(56) References Cited

U.S. PATENT DOCUMENTS

| | | | |
|---|---|---|---|
| 4,107,046 A * | 8/1978 | Corder ................ 210/282 |
| 5,540,107 A * | 7/1996 | Silverman et al. ........ 73/861.78 |
| 5,858,215 A * | 1/1999 | Burchard et al. .............. 210/87 |
| 6,016,977 A * | 1/2000 | Farley .................... 239/553.3 |
| 6,093,313 A | 7/2000 | Bovaird et al. |
| 6,270,023 B1 * | 8/2001 | Farley .................... 239/553.3 |
| 6,641,717 B2 * | 11/2003 | Okano et al. .................. 210/87 |
| 6,927,501 B2 * | 8/2005 | Baarman et al. .............. 290/43 |
| 2003/0125842 A1 | 7/2003 | Chang et al. |

* cited by examiner

*Primary Examiner*—Terry K Cecil
(74) *Attorney, Agent, or Firm*—Bacon & Thomas, PLLC

(57) ABSTRACT

A hand held shower head with a filter replacing pre-alarm assembly includes a propeller wheel with a magnetically induced signal emitter and a correspondingly placed signal receptor, as well as a digital display connected to the signal receptor. Upon a total accumulated quantity of water flow through a filter positioned within a hand held portion, a pre-alarm signal is generated, and upon reaching a critical point, a buzzer is activated to remind the user to replace the filter to ensure a quality filtered water.

2 Claims, 4 Drawing Sheets

HAND HELD SHOWER HEAD WITH FILTER REPLACING PRE-ALARM ASSEMBLY

FIELD OF THE INVENTION

The present invention relates to a hand held shower head with filter replacing pre-alarm assembly, and more particularly to one implemented by an added device to generate pre-alarm upon a total quantity of flowing water passing through the filter embedded therein. Upon reaching an effective critical point, it can initiate alarms to remind the user to replace the filter assembly timely in order to ensure filtered water of a good quality.

BACKGROUND OF THE INVENTION

Nowadays, our tap water in daily living is full of pesticides, chemical constituents and varieties of impurity, owing to rivers being polluted by industrial and household waste water, garbage and livestock excretion caused by modern industrialization as well as lacking of environmental protection. Although it has been purified in the public waterworks treatment by chlorinating, such water with some remaining chloride residuals becomes harmful to the health of a human being. Thus, civil consumers usually obtain their potable water from purification equipment they've purchased. Many households even have their own purification equipment installed at home on the shower to get a better quality of bathing water. The principle herewith is to adsorb or remove pesticides, chemical constituents and varieties of impurity in the water by means of embedded adsorbents such as activated carbon, metallic sulfite, KDF therein.

Presently, there are some conventional devices of hand held showerheads with filter assemblies such as the devices in the prior art of US Pat. Nos. 4,107,046; 6,016,977 and 6,270,023. Though these devices can filter the shower water efficiently in some degree, it will fail at the critical point of filter assembly (or service life) after operating for a certain period of time, depending on the specified maximum quantity of water filtered by accumulated flux therethrough.

For example, if a maximum quantity of water that can be filtered is 1500 gallons, then such is the critical point of filter assembly. Once the filter assembly reaches this critical point, it will be spent and deteriorated, then lose its filtering function due to accumulated impurities. It can resume its filtrating ability only by replacing with a new filter. However, for those filters of devices in the current marketplace, the label or tag attaching thereon provided by vendors only specifies its critical point (or Service Life) in terms of quantity in gallon unit, neither the measuring instrument nor the tool thereof is provided by vendors.

Therefore, upon purchasing a new filter assembly, the consumer is always reminded by vendor to replace the filter in a half year or some other number of months. But if the consumer replaces the filter prematurely before reaching its critical point, it becomes wasteful as an increasing economic burden. To the contrary, if a consumer replaces the filter beyond its critical point, the filtering function of the filter may fail due to an abundance of accumulated dirt. Thus, the user of the purification equipment may get a filtered water whose quality is much dirtier and worse than that of tap water—without a malfunctioned filter, which ingested by a human being can severely jeopardize health even more.

However, the time for reaching the critical point of hand held shower head with a filter assembly is subject to differences of the number of users in each family. For example, if the average daily usage of water quantity for each person is 2 gallons, then the filter assembly, which is embedded in the hand held shower head, can be operated validly for 250 days in a family of 3 users; however, it can be only operated validly for 125 days in a family of 6 users. In other words, the aforementioned filter assembly of the prior art neither offers a feature of pre-alarm upon reaching its critical point nor having precise measurement control or record-keeping, having the consequences of missing replacement times and still continuing to use the malfunctioned filter, causing skin discomfort such as allergy or itchiness. Even more, the chronic exposure of chlorine on the skin may make a user susceptible to cancer. Obviously, the customary filter assemblies of the preceding prior art are neither practical nor ideal in effectiveness.

SUMMARY OF THE PRESENT INVENTION

Accordingly, the present invention adds a device on the filter within the handhold of the hand held shower head for measuring water quantity by accumulated flow and initiating pre-alarm.

The main object of the present invention is to eliminate all the drawbacks of the foregoing conventional prior art devices, which are handicapped by lack of pre-alarm upon reaching critical point of the filter assembly therein. By the added device herein described ably measuring water quantity by accumulated flow and initiating pre-alarm, the user is reminded to replace the filter at the proper time to assure the filtered water is of good quality.

DETAILED DESCRIPTION OF THE PREFERRED EMBODIMENT

Figure 1:
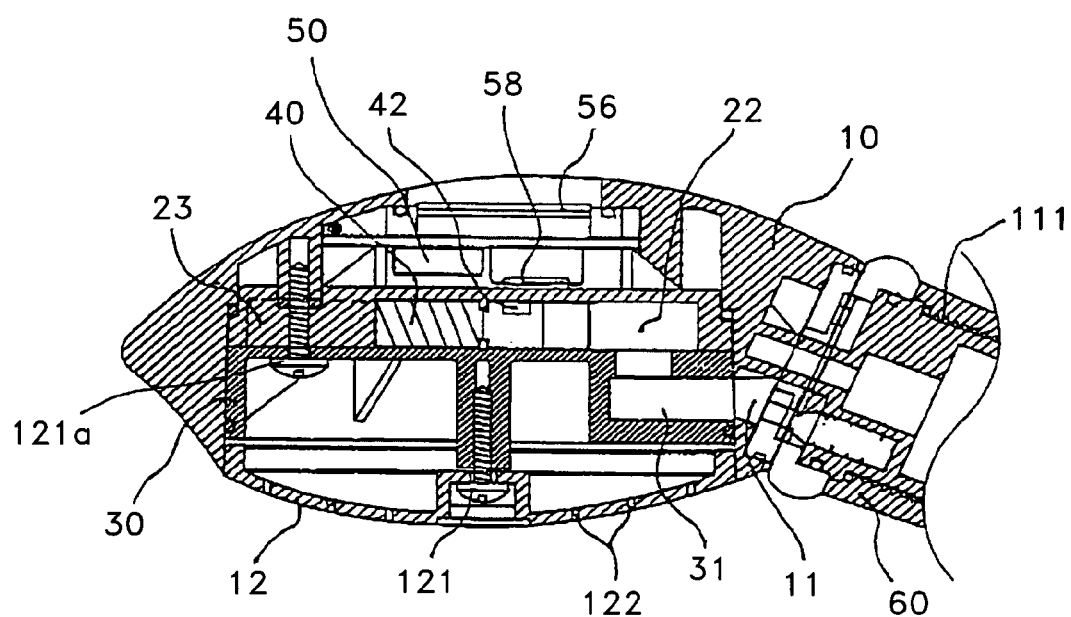
FIG. 1 is a sectional view of a handheld shower head with filter replacing pre-alarm assembly according to a first preferred embodiment of the present invention.
Figure 2:
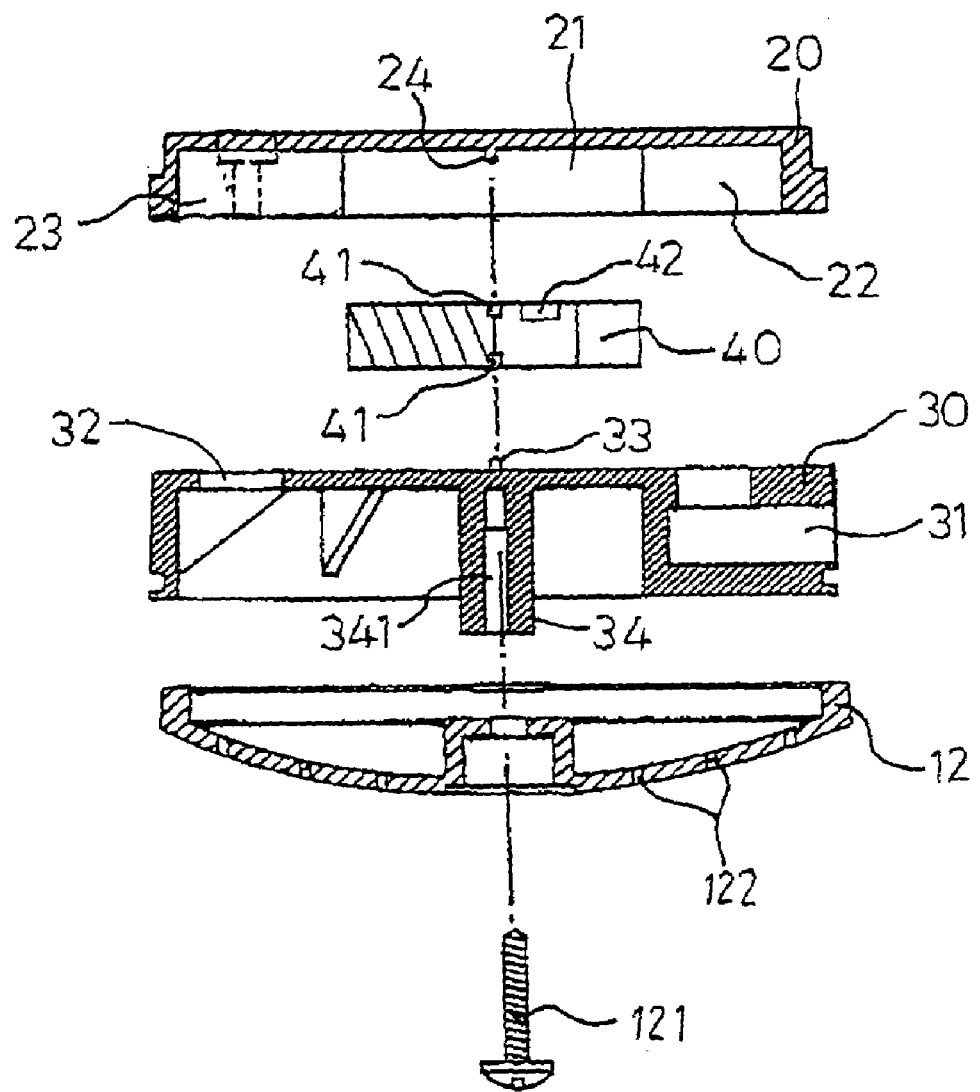
FIG. 2 is an exploded sectional view of the above first preferred embodiment of the present invention.
Figure 3:
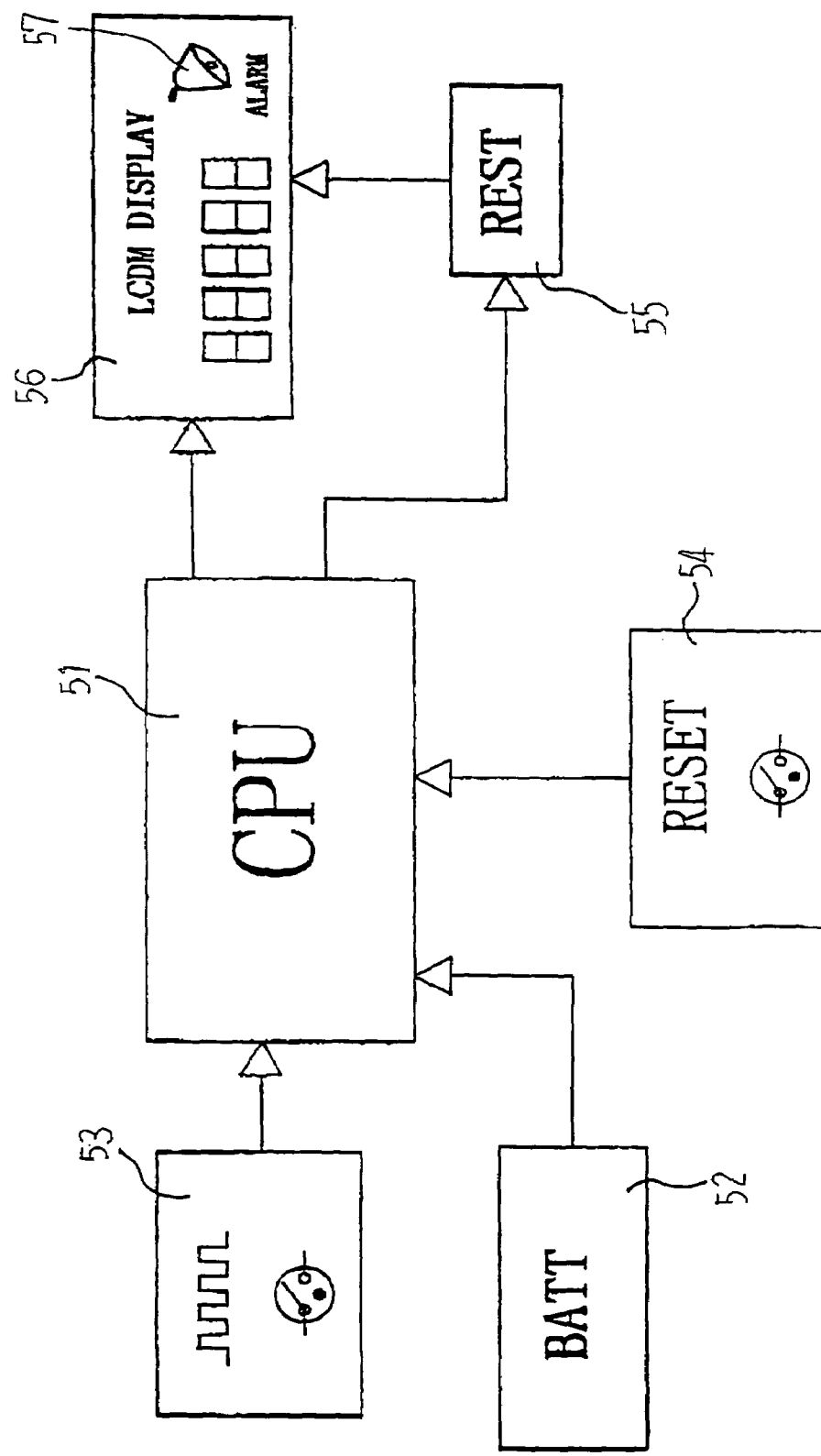
FIG. 3 is a circuit block diagram of a signal conversion display of the present invention.

Referring to FIG. 1 to 3, a hand held shower head with filter replacing pre-alarm assembly according to a first preferred embodiment of the present invention comprises a shower head 10, a base seat 20, a cover seat 30, a propeller wheel 40 and a signal circuit device 50.

Referring to FIGS. 1 and 2, the shower head 10 has a hollow body and a water inlet 11 which is having screw threads 111 formed thereon, and provided to connect with a filter hand hold 60. In front of the shower head 10 has firmly mounted a cover member 12 by means of a screw 121, and said cover member 12 has a plurality of spray holes 122 to allow the water spray out of the shower head 10. To the rear of the shower head 10 is tightly affixed a LCD display circuit 56, is used in displaying an instruction sent by the microprocessor 51 of the signal circuit device 50(as shown in FIG. 3).

Referring to FIGS. 1 and 2, the base seat 20, the cover seat 30 and the propeller wheel 40 are totally affixed in the inner of the shower head 10, wherein the bottom surface of the base seat 20 forms an indented water chamber 21. The base seat 20 has a water inlet channel 22 and a outlet channel 23 which is formed at the two sides of the water chamber 21 and through with each other. A rotation axle 24 is downwardly protruded from central area of a top surface of the water chamber 21 of the base seat 20.

Referring to FIG. 2, The cover seat 30 is tightly affixed on the bottom side of the base seat 20 with the bottom surface of the base seat 20 abutting to a top surface of the cover seat 30. The cover seat 30 has a water inlet 31 which has two ends corresponding to the inlet channel 22 and the water inlet 11 respectively and is formed on a side surface of the cover seat 30. The cover seat 30 has a water outlet 32 which is corresponding to the outlet channel 23 and is formed on a top surface of the cover seat 30. A supporting axle 33 is upwardly protruded from a central area of a top side of the cover seat 30, and the opposite side is downwardly protruded a threaded hole 341 of central dowel 34.

Referring to FIG. 2, The propeller wheel 40 is a circular body which has a plurality of curved propeller blades are extended radically from the circular body. Two central axial recesses 41 are coaxially at a center of top side and a bottom side of the propeller wheel 40 respectively. A magnetic element 42 is embedded on a top side of the propeller wheel 40. The propeller wheel 40 is situated and supported in the water chamber 21 of the base seat 20 in rotatable manner that, the rotation axle 24 and the supporting axle 33 are fitted into the two central axial recesses 41 located in the center of the water chamber 21 of the base seat 20 (as shown in FIG. 1).

Referring to FIG. 3, The signal circuit device 50 of the present invention comprises a microprocessor 51, a DC power supply 52 electrically connected to the microprocessor 51, a transducer 53 electrically connected to the microprocessor 51, a reset switch 54 electrically connected to the microprocessor 51, a rest switch 55 electrically connected to the microprocessor 51, a LCD display circuit 56 electrically connected to the microprocessor 51, a buzzer 57 electrically connected to the microprocessor 51 and a signal receiver 58 which is closed at the top surface of base seat 20 and corresponding to the magnetic element 42 (as shown in FIG. 1).

As shown in FIG. 1, Assemble the base seat 20, the cover seat 30 and the propeller wheel 40 by means of the screws 121, 121a and affixed to the inner of the shower head 10, so that the water inlet 31, the inlet channel 22, the water chamber 21, the outlet 23 and the water outlet 32 define a water flowing passage.

Referring to FIGS. 1 and 3, In accordance with an operating mode of the present invention a water supply pipe is connected to the filter handhold 60. Water flow enters the water chamber 21 through the water inlet 31 and inlet channel 22, forcing the propeller wheel 40 to rotate, and flows out through the outlet channel 23, the water outlet 32 and the spray holes 122 of the cover member 12. When the propeller wheel 40 rotates, the magnetic element 42 induces the signal receiver 58 of the signal circuit device 50, so that the signal receiver 58 receives a sensor signal and transmit to the microprocessor 51 via the transducer 53. Such continuous signals are transmitted to the microprocessor 51 and will process sending corresponding signals to the LCD display circuit 56, An accurate quantity of flow can be calculated according to the equation:

Quantity of Flow($Q$)=Cross Sectional Area($A$)×Flow Velocity($V$)

The total water making volume value, that is a total volume of flowing water made by the filtration element 62 of the filter handhold 60, is formatted and input into the microprocessor 51 as a predetermined reference value which is a digital standard reference value showing the service life (critical point) of the respective filtration element. When the total flowing volume value reach to the service life of the filter handhold 60, the microprocessor 51 will sending a signal to the buzzer 57 for advancing a warning alarm to notify that it is the time for the user to replace a new filtration element of the filter handhold 60. Therefore, the user can avoid in consequence of missing replacement timing and still continuously using the malfunctioned filter.

Figure 4:
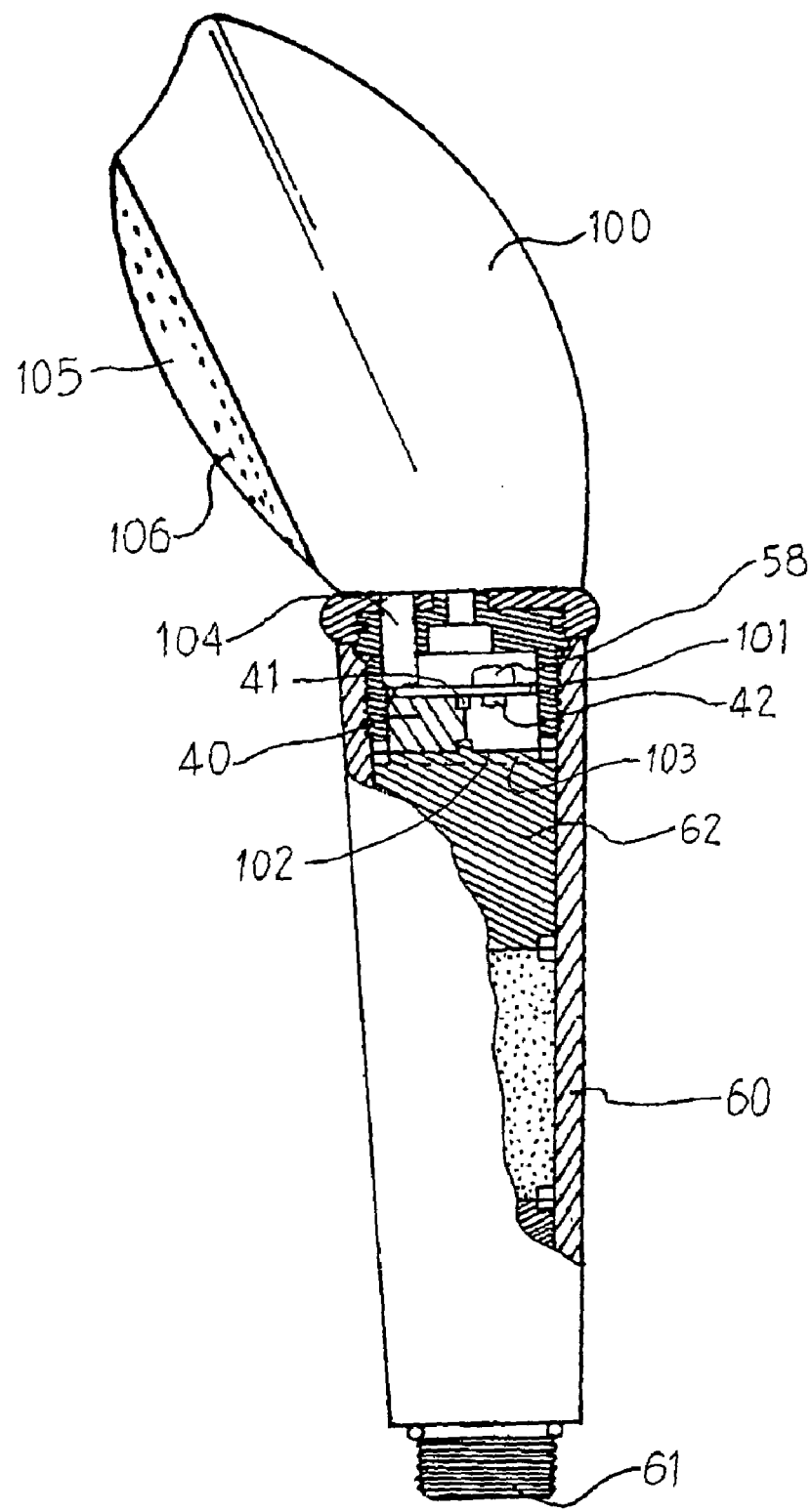
FIG. 4 is a sectional view of a handheld shower head with filter replacing pre-alarm assembly according to a second preferred embodiment of the present invention.

Referring to FIG. 4, a hand held shower head with filter replacing pre-alarm assembly according to a second preferred embodiment of the present invention is illustrated in which the propeller wheel 40 has the same structure and the signal circuit device 50 is the same as in the above first preferred embodiment. The second embodiment is modification made to the shower head 10.

In accordance with the second preferred embodiment, the shower head 100 of the second preferred embodiment has a hollow body which is secured at a elongate thread portion 101, and provided to connected with a filter hand hold 60. A water chamber 102 formed in the bottom surface of the elongate thread portion 101. The shower head 100 has a water inlet 103 and a water outlet 104 are formed at the two sides of the water chamber 102 respectively and through with each other. In front of the shower head 100 has firmly mounted a cover member 105 which has a plurality of spray holes 106 to allow the water spray out of the shower head 100. To the rear of the shower head 10 is tightly affixed a LCD display circuit 56, is used in displaying an instruction sent by the microprocessor 51 of the signal circuit device 50(as shown in FIG. 3). The propeller wheel 40 is situated and supported in the water chamber 102 of the shower head 100 in rotatable manner that, and the signal receiver 58 is mounted and corresponding at the top of the magnetic element 42 of the propeller wheel 40.

Referring to FIG. 4, In accordance with an operating mode of the second embodiment of the present invention a water supply pipe is connected to the input end portion 61 of the filter handhold 60, water flow enters the water chamber 102 through the water inlet 103, forcing the propeller wheel 40 to rotate, and flows out through the water outlet 104 and the spray hole 106 of the cover member 105. When the propeller wheel 40 rotates, the magnetic element 42 induces the signal receiver 58 of the signal circuit device 50, so that the signal receiver 58 receives a sensor signal and transmits to the microprocessor 51 via the transducer 53. Such continuous signals are transmitted to the microprocessor 51 and will process sending corresponding signals to the LCD display circuit 56. An accurate quantity of flow can be calculated according to the equation:

Quantity of Flow($Q$)=Cross Sectional Area($A$)×Flow Velocity($V$)

The total water making volume value, that is a total volume of flowing water made by the filtration element of the filter handhold 60, is formatted and inputted into the microprocessor 51 as a predetermined reference value which is a digital standard reference value showing the service life (critical point) of the respective filtration element. When the total flowing volume value reach the service life of the filter handhold 60, the microprocessor 51 will send a signal to the buzzer 57 for advancing a warning alarm to notify that it is the time for the user to replace the filtration element of the filter handhold 60. Therefore, the user can avoid the consequence of missing the replacement time and continuing to use a malfunctioned filter.

In conclusion by summing up the description mentioned above, the present invention has the following creative effects:

To allow the filter in a hand held shower head produce a maximum amount of filtered water for effective utilization thereof;

To generate audible and visible alarms to inform the user when the filter in a hand held shower head reaches (or nearly reaches) its critical point; and To allow a user to timely replace the malfunctioned filter in a hand held shower head to meet the goal of making the best use of any resources or asset, to let it serve to its proper purpose in maximum practical efficiency and economical gain. So, it has inherently extreme value in industrial application of its own.

What is claimed is:

1. A hand held shower head and filter with a filter replacing alarm assembly, comprising:
   a shower head having a hollow body and a water inlet having screw threads formed thereon connected with a filter hand hold, said filter handhold including a filter therein;
   in front, said shower head has firmly mounted a cover member by means of a screw, and said cover member has a plurality of spray holes to allow water to spray out of said shower head;
   in rear, said shower head has tightly affixed an LCD display circuit used in displaying an instruction sent by a microprocessor of a signal circuit device;
   a base seat affixed in the inner of said shower head, wherein a bottom surface of said base seat forms an indented water chamber, said base seat has a water inlet channel and an outlet channel which are formed at two sides of said water chamber and connected with each other;
   a rotation axle is downwardly protruded into said water chamber from a central area of a bottom surface of said base seat;
   a cover seat is tightly affixed on a bottom side of said base seat with the bottom surface of said base seat abutting to a top surface of said cover seat, said cover seat has a water inlet which has two ends corresponding to said inlet channel and said water inlet respectively and is formed on a side surface of said cover seat, said cover seat has a water outlet which is corresponding to said outlet channel and is formed on a top surface of said cover seat;
   a supporting axle is upwardly protruded from a central area of the top surface of said cover seat, and a central dowel having an internally threaded hole defined therein is downwardly protruded from a bottom side of said cover seat;
   a propeller wheel is situated and supported in said water chamber of said base seat, wherein said propeller wheel is a circular body having a plurality of curved propeller blades extended radially therefrom, and a magnetic element is embedded on a top side of said circular body, wherein two central axial recesses are coaxial at a center of a top side and a bottom side of said propeller wheel respectively; and;
   a signal circuit device comprising a microprocessor, a DC power supply electrically connected to said microprocessor, a transducer electrically connected to said microprocessor, a reset switch electrically connected to said microprocessor, a reset switch electrically connected to said microprocessor, an LCD display circuit electrically connected to said microprocessor,
   a buzzer electrically connected to said microprocessor and a signal receiver which is enclosed at a top surface of said base seat and corresponding to the magnetic element of said propeller wheel.

2. A hand held shower head with filter replacing pre-alarm assembly, comprising:
   a shower head having a hollow body which is secured at an elongate thread portion connected with a filter hand hold, said filter handhold including a filter therein;
   a water chamber formed in a bottom surface of said elongate thread portion, said shower head has a water inlet and a water outlet formed at two sides of said water chamber respectively and connected with each other, in a front of said shower head hollow body is firmly mounted a cover member which has a plurality of spray holes to allow the water to spray out of said shower head;
   in a rear of said shower head hollow body is tightly affixed an LCD display circuit device including a microprocessor, said LCD display displays an instruction sent by the microprocessor of a signal circuit device; and
   a propeller wheel situated and supported in said water chamber of said elongate thread portion, wherein said propeller wheel is a circular body having a plurality of curved propeller blades extended radially therefrom, and a magnetic element embedded therein on a top side of said circular body, wherein two central axial recesses are coaxial at a center of a top side and a bottom side of said propeller wheel respectively,
   and a signal receiver which is enclosed within said elongate thread portion above a top surface of said water chamber and corresponding to the magnetic element of said propeller wheel.

* * * * *